US008103655B2

(12) United States Patent  (10) Patent No.: US 8,103,655 B2
Srinivasan et al.  (45) Date of Patent: *Jan. 24, 2012

(54) SPECIFYING A FAMILY OF LOGICS DEFINING WINDOWS IN DATA STREAM MANAGEMENT SYSTEMS

(75) Inventors: Anand Srinivasan, Bangalore (IN); Namit Jain, Santa Clara, CA (US); Parul Jain, Mountain View, CA (US); Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1064 days.

This patent is subject to a terminal disclaimer.

(21) Appl. No.: 11/927,683

(22) Filed: Oct. 30, 2007

(65) Prior Publication Data

US 2009/0112803 A1  Apr. 30, 2009

(51) Int. Cl.
   G06F 17/30 (2006.01)
(52) U.S. Cl. ........................................ 707/713
(58) Field of Classification Search .................. 707/713, 707/769
   See application file for complete search history.

(56) References Cited

U.S. PATENT DOCUMENTS

| 7,383,253 | B1* | 6/2008 | Tsimelzon et al. | 707/610 |
| 7,403,959 | B2* | 7/2008 | Nishizawa et al. | 1/1 |
| 7,613,848 | B2* | 11/2009 | Amini et al. | 710/29 |
| 2007/0022092 | A1* | 1/2007 | Nishizawa et al. | 707/2 |
| 2007/0136239 | A1* | 6/2007 | Lee et al. | 707/2 |
| 2008/0301124 | A1* | 12/2008 | Alves et al. | 707/5 |

OTHER PUBLICATIONS

Babu et al., Continuous Queries Over Data Streams, Sep. 2001, pp. 109-120.*

Goleb et al., Issues in Data Stream Management, Jun. 2003, pp. 5-14.*
Arasu et al., CQL: A Language for Continuous Queries over Streams and Relations, 2004, pp. 1-19.*
"Stanford Stream Data Manager", "http://infolab.stanford.edu/stream/", Last modified: Jan. 5, 2006, pp. 1-5.
Arvind Arasu, et al, "STREAM: The Stanford Data Stream Management System", Mar. 2004, pp. 1-21.
Jennifer Widom, "The Stanford Data Stream Management System", Talk on Stanford Stream Data Manager, updated Jan. 2006, pp. 1-48.
Jennifer Widom, "CQL: A Language for Continuous Queries Over Streams and Relations", Invited talk given at the 2003 DBPL Workshop (Sep. 2003), pp. 1-62.
"STREAM: The Stanford Stream Data Manager", IEEE Data Engineering Bulletin, Mar. 2003, pp. 1-8.
Rajeev Motwani, et al , "Query Processing, Resource Management, and Approximation in a Data Stream Management System", Proceedings of CIDR 2003, Jan. 2003. Arvind Arasu and Shivnath Babu and Jennifer Widom, "The CQL Continuous Query Language: Semantic Foundations and Query Execution", "The VLDB Journal—The International Journal on Very Large Data Bases", vol. 15, Issue 2 (Jun. 2006), pp. 121-142 Published in 2006 (ISSN No. 1066-8888).
Sirish Chandrasekaran et al , "TelegraphCQ: Continuous Dataflow Processing for an Uncertain World", Proceedings of the 2003 CIDR conference, 2003, pp. 1-12.

* cited by examiner

*Primary Examiner* — James Trujillo
*Assistant Examiner* — Jorge A Casanova
(74) *Attorney, Agent, or Firm* — Narendra Reddy Thappeta

(57) ABSTRACT

Simplifying a user's task in specifying a family of logics, with each logic designed to potentially select different subsets of values from the same continuous data stream at the same time instant. In one embodiment, all the logics are together specified by a common user specified software code design to accept a set of parameters, with different logics resulting from execution of the software code with different parametric values. Thus, when closely related family of logics are to be developed, the common software code may be formulated, with the code being designed to accept parameters and providing different logics for different sets of parametric values corresponding to the parameters.

12 Claims, 10 Drawing Sheets

```
511:   public interface GenericTimeWindow {
512:       public boolean expireW(Timestamp r, Timestamp result);
513:       public boolean visibleW(Timestamp t, Timestamp result);
514:   }
```

FIG. 5A

```
531:   public class CurrentMonth implements GenericTimeWindow {
532:       private Calendar cal;

533:       public CurrentMonth() {
534:           cal = Calendar.getInstance();
535:       }

536:       public boolean expireW(Timestamp r, Timestamp result) {
537:           int month = r.getMonth();
538:           int year  = r.getYear();
539:           cal.clear();
540:           cal.set(year, month+1, 1);
541:           result.setTimeInMillis(cal.getTimeInMillis());
542:           return true;
543:       }

544:       public boolean visibleW(Timestamp r, Timestamp result) {
545:           result.setTimeInMillis(r.getTimeInMillis());
546:           return true;
547:       }
548:   }
```

FIG. 5B

```
811:   public class RangeMonth implements GenericTimeWindow {
812:       private Calendar cal;
813:       private int range;

814:       public RangeMonth(int range) {
815:           cal = Calendar.getInstance();
816:           this.range = range;
817:       }

818:       public boolean expireW(Timestamp r, Timestamp result) {
819:           int month = r.getMonth();
820:           int year  = r.getYear();
821:           cal.clear();
822:           cal.set(year, month+range, 1);
823:           result.setTimeInMillis(cal.getTimeInMillis());
824:           return true;
825:       }

826:       public boolean visibleW(Timestamp r, Timestamp result) {
827:           result.setTimeInMillis(r.getTimeInMillis());
828:           return true;
829:       }
830:   }
```

*FIG. 8A*

| | Data Value | T | Visible | Expire |
|---|---|---|---|---|
| 870 | 20 | Apr 22 | Apr 22 | Jun 1 |
| 872 | 60 | May 6 | May 6 | Jul 1 |
| 874 | 15 | May 13 | May 13 | Jul 1 |
| 876 | 40 | May 27 | May 27 | Jul 1 |
| 878 | 35 | Jun 10 | Jun 10 | Aug 1 |

*FIG. 8B*

SPECIFYING A FAMILY OF LOGICS DEFINING WINDOWS IN DATA STREAM MANAGEMENT SYSTEMS

RELATED APPLICATION

The present application is related to co-pending non-provisional U.S. application entitled, "Facilitating Flexible Windows in Data Stream Management Systems", Ser. No. 11/927,681, filed on even date herewith, naming as inventors: Srinivasan et al, and is incorporated in its entirety herewith.

BACKGROUND

1. Technical Field

The present disclosure relates to data stream management systems and more specifically to specifying a family of logics defining windows in data stream management systems.

2. Related Art

A data stream management system generally refers to a system, which executes queries on a subset of a stream of values received continuously over a period. The same query is generally executed at different time instants on corresponding subsets of values (in a received stream) to generate corresponding query outputs. The query outputs form the result of performance of the query on the continuous stream of values.

The subset of values on which a query is executed at a corresponding time instant may be referred to as a window. As an illustration, the subset of values for a window may be determined at different desired time instants and the query executed with the recomputed window. For example, in a time-based windowing technique, a window may be defined to have a width of 30 minutes indicating that the values in the last 30 minutes (from the current time) be used to find the output of a execution of the query at that corresponding time instant.

In a prior data stream management system based on Continuous Query Language (described in further detail in a document entitled, "The CQL Continuous Query Language: Semantic Foundations and Query Execution" by Arvind Arasu, Shivnath Babu and Jennifer Widom), a window is specified using pre-defined constructs, which have a meaning specified by a designer of a language used to query a continuous data stream, and a developer of specific queries can merely specify values (by numbers or variables generally) associated with the constructs. Examples of such pre-defined constructs include 'minutes', 'range', 'slide', etc.

Such pre-specified constructs for specifying windows may not be adequate in several environments.

BRIEF DESCRIPTION OF THE DRAWINGS

Example embodiments of the present invention will be described with reference to the accompanying drawings briefly described below.

FIG. 5A depicts a portion of an interface based on which a software code associated with a window used in querying a continuous data stream is written in an embodiment.

FIG. 5B depicts a portion of a software code associated with a window used in querying a continuous data stream in an embodiment.

FIG. 8A depicts a portion of a software code associated with a window accepting parameters used in querying a continuous data stream in an embodiment.

FIG. 8B depicts a table that may be generated in memory corresponding to data values received in a continuous data stream when software code associated with a window accepting parameters is executed in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention simplifies a user's task in specifying a family of logics, with each logic designed to potentially select different subsets of values from the same continuous data stream at the same time instant. In one embodiment, all the logics are together specified by a common user specified software code design to accept a set of parameters, with different logics resulting from execution of the software code with different parametric values.

Thus, when closely related family of logics are to be developed, the common software code may be formulated, with the code being designed to accept parameters and providing different logics for different sets of parametric values corresponding to the parameters.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
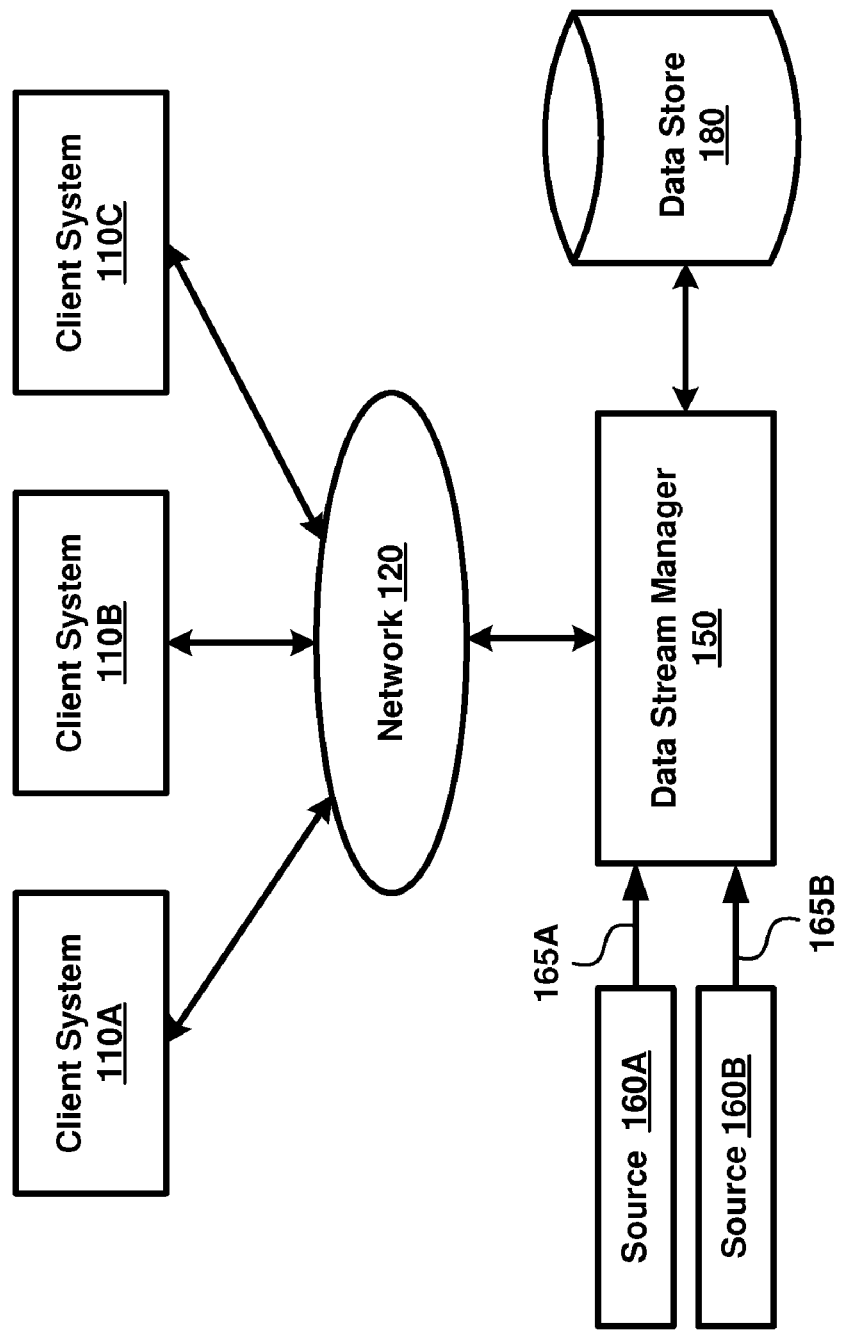
FIG. 1 is a block diagram illustrating an example environment in which several aspects of the present invention can be implemented.

FIG. 1 is a block diagram illustrating an example environment in which several aspects of the present invention can be implemented. The block diagram is shown containing client systems 110A-110C, network 120, data stream manager 150, sources 160A-160B (generating continuous data streams 165A and 165B respectively), and data store 180.

Merely for illustration, only representative number/type of systems are shown in the Figure. Many environments often contain many more systems, both in number and in type, depending on the purpose for which the environment is designed. Each system/device of FIG. 1 is described below in further detail.

Network 120 provides connectivity between various clients systems 110A-110C and data stream manager 150. Network 120 may be implemented using protocols such as Internet Protocol (IP) well known in the relevant arts.

Data store 180 facilitates storage and retrieval of a collection of data, for example, the queries to be performed on corresponding continuous data streams and/or intermediate results of execution of the queries. In an embodiment, data store 180 is implemented as a file server maintaining the queries/intermediate results in one or more corresponding files.

Each of sources 160A-160B represents a set of systems/devices, which together generate data values continuously as a respective data stream. Each data stream may be generated by one of more devices/systems contained in the corresponding source. As an illustration, in a manufacturing environment, source 160A may correspond to a thermometer that detects the temperature of an apparatus (not shown) every 5 minutes. The temperature readings of the thermometer may be sent to data stream manager 150 via 165A as a corresponding data stream. It may be appreciated that sources 160A-160B may send the stream of data values to data stream manager 150 using an appropriate network (not shown).

Each of client systems 110A-110C represents a system such as a personal computer, workstation, mobile station, etc. A client system may be used by a user/developer to generate requests (containing queries to be performed on continuous data streams such as 165A and 165B) to data stream manager 150 according to several aspects of the present invention as described in sections below. The requests may be generated according to a suitable interface.

It may be appreciated that the result of the query (containing output of performance of the query at corresponding time instants) may be sent to the requesting client system as a response to the request. Further, other client systems may request for receiving the result of the same query, and receive in response the same outputs at corresponding time instants.

Data stream manager 150 receives requests (containing queries) from one of client systems 110A-110C. Each of the received queries may specify windows to be used on corresponding data streams for generating the result of the query. Data stream manager 150 may maintain the received queries and/or intermediate results generated during the execution of the received queries in data store 180.

Data stream manager 150 receives a query specifying a window on a data stream, and processes the query based on the values in the data stream and the definition of the window as described with examples in below sections. For illustration, an example base system is first described, and the manner in which the base system can be extended according to several aspects of the present invention, is described next.

3. Base System for Processing Queries on Continuous Data Streams

Figure 2:
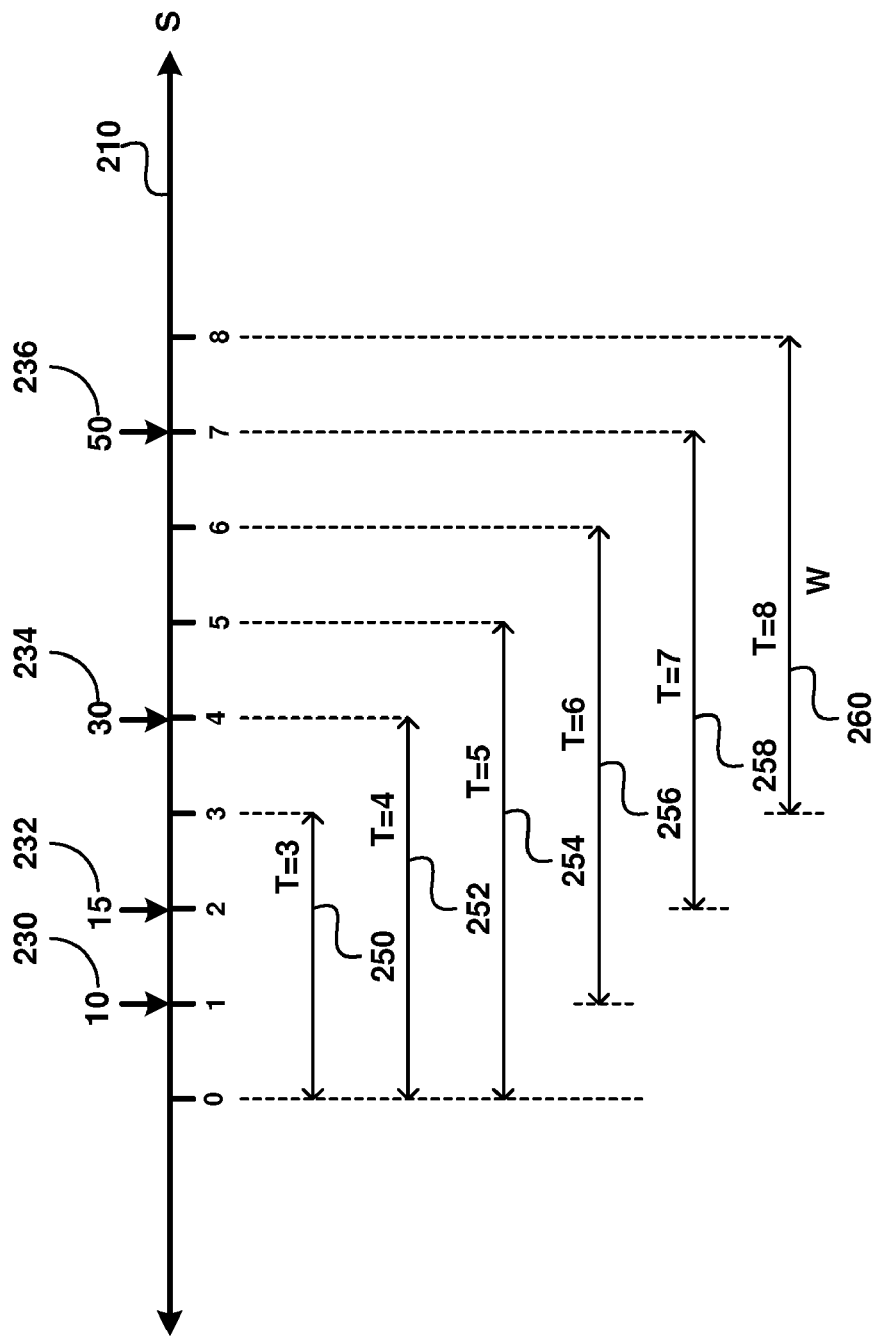
FIG. 2 depicts a timeline illustrating the manner in which a query on a continuous data stream is processed in a base system in an embodiment.

FIG. 2 depicts a timeline illustrating the manner in which a query on a continuous data stream is processed in a base system in an embodiment. It may be appreciated that different windowing techniques may be used for defining a window.

One such technique is called time-based windowing technique, in which a window is specified as a time interval of a fixed width (or specifically the values received in such an interval), for example, a window of width 30 minutes, or a window of 1 week (or 7 days). In such a technique, the window (termed as the "current window") may be calculated with respect to the current time representing the data values received in a continuous data stream between the current time and 30 minutes (the time interval) before the current time (assuming the data is being processed in real time, for illustration).

The description is continued assuming that the queries are specified using Continuous Query Language (CQL) described in detail in an article entitled "The CQL Continuous Query Language: Semantic Foundations and Query Execution" by Arvind Arasu, Shivnath Babu and Jennifer Widom, in "The VLDB Journal—The International Journal on Very Large Data Bases", Volume 15, Issue 2 (June 2006), pages 121-142 published in 2006 (ISSN number 1066-8888).

Timeline 210 depicts time instants at which events are received on a continuous data stream "S". The timeline is marked with time instants of "0", "1" etc., to "8" representing discrete intervals of time. The time instants may correspond to a time point at which the value is received or when the value is generated. For simplicity, it is assumed that each of the discrete intervals represents one minute. The time instant "0" represents the start time of the timeline and the time instant "8" represents the end time of the timeline.

Events 230, 232, 234 and 236 represent values that are received at different time instants. Thus, event 230 represents a data value "10" received in the continuous data stream "S" at time instant T=1 (minute). Similarly event 232 represents a data value "15" received at time instant T=2, event 234 represents a data value "30" received at time instant T=4 and event 236 represent a data value "50" received at time instant T=7.

Data stream manager 150 receives the following query at time instant T=3:

select * from S [range 5 minutes];

wherein the words "select", "from", "range" and "minutes" and the symbols "*", "[", "]" and ";" represent constructs having a pre-defined meaning (specified by the designer of the language) in the query language. The query specifies that all the values in a time-based window with width 5 minutes (as indicated by "[range 5 minutes]") on stream "S" be returned as the result of the query.

It may be appreciated that any desired condition (selection criteria) potentially covering multiple streams may be specified. For example a "where" construct specifying the desired condition may be added to the above query, the "from" construct may be modified to specify multiple streams and the "*" may be replaced by attribute names indicating the specific attributes to be retrieved from the multiple streams.

On receiving such a query, the data stream manager determines the values in the stream that are to be included in the current window at the current time instant (based on the definition of the window). At time instant T=3, data stream manager 150 determines that the current window would be between the time instants "0" and "3" minutes (assuming that there are no events occurring before "0") as shown by window 250. Events 230 and 232 are determined to be included in the window since the events occur between the time instants "0" and "3" minutes.

The data stream manager then performs the operations specified by the query to generate an output of the query.

Since the above query specifies that the values are to be returned, the data values "10" and "15" corresponding to events 230 and 232 are determined to be the result of performing the query at time instant T=3. The output of the query may then be sent back to one of client systems 110A-110C.

At time instant T=4, data stream manager 150 determines that the current window would be between time instants "0" and "4" minutes as shown by window 252. Data stream manager 150 performs the step of determining the events (230, 232 and 234) to be included in the window and generating the output (corresponding data values "10" "15" and "30") based on the window.

Similarly windows 254, 256, 258 and 260 represents the current window at time instants T=5, T=6, T=7 and T=8 respectively. It may be observed that events 230 and 232 are not included in window 260 as they were received more than 5 minutes before the current time (T=8) (i.e., the reference time point for the window). Corresponding outputs of the query may be generated. In an embodiment, the windows at time instants T=5 and T=6 need not be specifically determined since the contents of the window do not change with respect to the previous windows at time instant T=4 (i.e., no new events are received).

Alternatively, a query may specify the frequency or the time interval at which results of a query are to be generated as shown below:

select * from S [range 5 minutes slide 2 minutes start at 3 minutes];

wherein "slide" indicates the time intervals at which the outputs are to be generated, and "start at" indicates the time instant at which the generation of the output is to start. These two terms represent constructs (besides the constructs described above) having a pre-defined meaning in the query language.

Thus, data stream manager 150 on receiving the above query generates the outputs of the query at a time interval of 2 minutes (as indicated by "slide 2 minutes") starting from T=3 (as indicated by "start at 3 minutes"). As such, outputs are generated based only on windows 250 (at time instant T=3), 254 (at time instant T=5), and 258 (at time instant T=7).

Though only a few representative constructs of CQL have been shown in the above examples, it may be appreciated that constructs in a query language having pre-defined meaning may not be adequate in describing flexible windows such as windows having a variable width. For example, it may not be possible to specify a window having a width of the current month (since the time duration of the current month in minutes is not fixed). An aspect of the present invention facilitates a user to define and use a flexible window in querying continuous data streams as described in detail below.

4. Facilitating Flexible Windows

Figure 3:
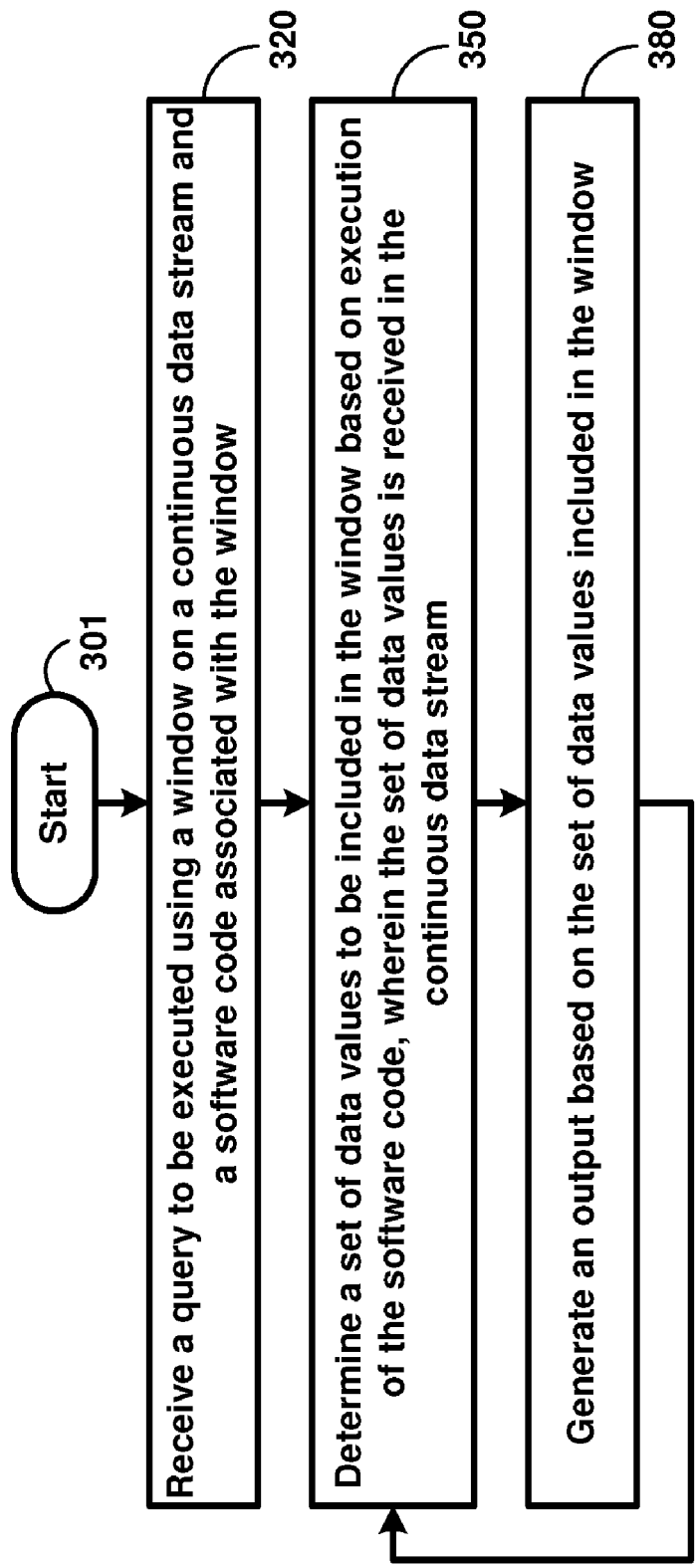
FIG. 3 is a flowchart illustrating the manner in which flexible windows are defined and used in querying continuous data streams according to an aspect of the present invention.

FIG. 3 is a flowchart illustrating the manner in which flexible windows are defined and used in querying continuous data streams according to an aspect of the present invention. The flowchart is described with respect to FIGS. 1 and 2 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 320.

In step 320, data stream manager 150 receives a query to be executed using a window on a continuous data stream and a software code associated with the window. The software code contains various programming instructions, which can be provided by a developer of queries (in contrast to merely providing values associated with query language constructs, which are defined by a designer of the query language). The query and the software code may be received from one of client systems 110A-110C and may be stored in data store 180. The query may specify one or more continuous data streams such as 165A-165B for which the query is to be processed using corresponding windows.

In step 350, data stream manager 150 determines a set of data values to be included in the (current) window (for a current time instant) based on execution of the software code, wherein the set of data values is received in the continuous data stream. In one embodiment, the software code is provided with specific interfaces/functions that indicate whether a data value in the continuous data stream is to be included in or excluded from the (current) window. Though the software code is described as selecting the data values for a single window in the illustrative example below, it should be appreciated that the software code can cover selection of data values for respective ones of multiple windows.

In step 380, data stream manager 150 generates an output based on the data values included in the window at the current time instant). In general, each query specifies a selection criteria (based on various operations such as joins, conditions, specific attributes, etc.), and the specific ones of the data values in the window matching the selection criteria are included in the output. During the determination and generation of outputs, some of the data values received in the continuous data stream may be stored in data store 180 depending on the operations specified in the query. The output may be sent to one of client systems 110A-110C.

Control then passes to step 350. The control may be passed after a delay in time based on the frequency/time interval of generation of the result. As described above, the frequency/time interval may be pre-determined (for example, every one minute) or may be specified in the query (for example using the "slide" option when defining a window).

Thus, data stream manager 150 performs the steps 350 and 380 repeatedly at a desired frequency/time interval, while processing the continuous data stream using a window and generating the outputs at corresponding time instants (forming the result of the query).

It may be appreciated that the query is processed based on the data values determined to be included in a window based on the execution of the software code. Thus, by providing an appropriate software code, a user (developer of queries) may specify a flexible window such as a window having a variable width. The description is continued with respect to an example implementation of data stream manager 150 in one embodiment.

5. Data Stream Manager

Figure 4A:
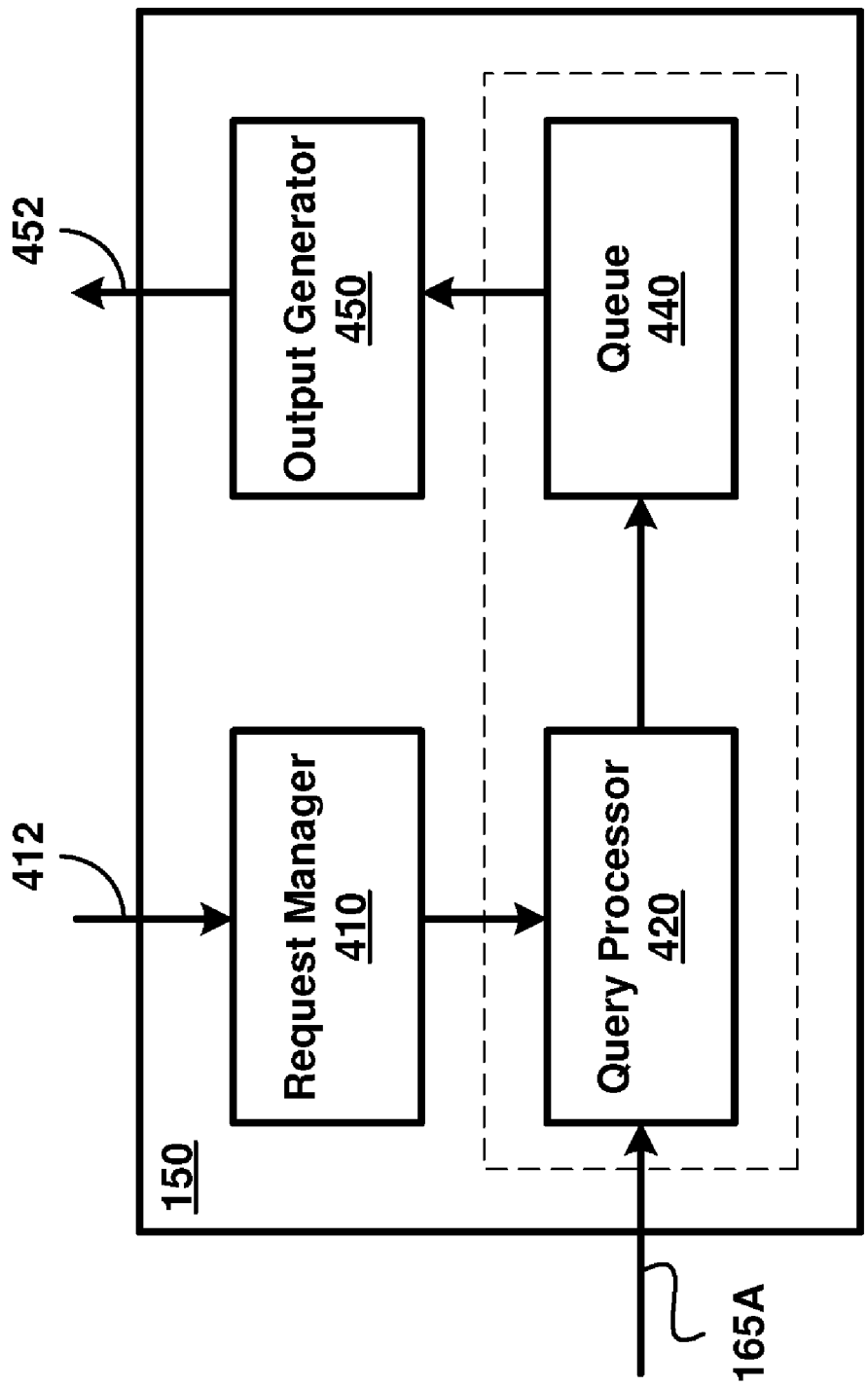
FIG. 4A is a block diagram illustrating the details of a data stream manager in an embodiment.

FIG. 4A is a block diagram illustrating the details of data stream manager 150 in an embodiment. The block diagram is shown with request manager 410, query processor 420, queue 440, and output generator 450. Each block is described below.

Request manager 410 receives requests from one of client systems 110A-110C (via network 120) for execution of queries on continuous data streams (such as 165A). Request manager 410 may also receive software code associated with windows used in the received queries from one of client systems 110A-110C.

On receiving a query (and associated software code) to be performed on a data stream using a window, request manager 410 creates and/or notifies an instance of query processor 420 to process the query based on the stream of values. In the scenario that a software code is associated with the window, request manager 410 may also send the associated software code to query processor 420. Request manager 410 may also notify output generator 450 about the manner in which the responses are to be generated, for example, the location of the requesting client systems, the format of the response, etc.

Query processor 420 receives a query from request manager 410 and generates the various outputs (for respective time instants). The outputs may be stored in queue 440. In an embodiment, query processor 420 generates a query plan specifying a set of operators (where each operator represents a program logic designed to execute one operation of the query) corresponding to the received query is generated. Query processor 420 also appropriately schedules the execution of the set of operators for generating an output of the query. Query processor 420 may be implemented by extending the concepts described in a paper entitled, "STREAM: The Stanford Data Stream Management System" by Arvind Arasu et al, and available from Department of Computer Science, Stanford University.

Query processor 420 on receiving data values from a source (such as source 160A) in the form of a continuous data stream (such as 165A) may determine whether each value received on the data stream is to be included in or excluded from the current window (i.e., the window as defined at each of the time instants). The determination may be performed by execution of the software code associated with the window received from request manager 410.

Query processor 420 then processes the data values based on the selection criteria in the query. Though the query processor is shown as processing values from a single data stream, it may be appreciated that the query processor may be suitably modified to process data values from multiple continuous data streams, as desired in specific environments.

Queue 440 represents a memory where data values (and corresponding time instants) forming corresponding outputs are stored. The values in queue 440 may be stored to/retrieved from a non-volatile memory such as data store 180 during execution of the query.

It may be appreciated that request manager 410 may initialize multiple instances of query processor 420 and queue 440 to process different queries. As such, each instance of query processor 420 receives data values on multiple streams, processes the received data values based on single/multiple window definitions and the selection criteria specified in the query, with the final data values in queue 440 representing the output of the query at a corresponding time instant.

Output generator 450 inspects queue 440 and generates corresponding outputs of each query as indicated by the data values stored in queue 440. The generated output may then be sent to one of client systems 110A-110C (via network 120) as notified by request manager 410.

From the above, it may be appreciated that the user is provided the capability of specifying flexible windows using any desired software code. Such an approach is in sharp contrast to a prior approach based on keywords alone, as illustrated logically below.

Figure 4B:
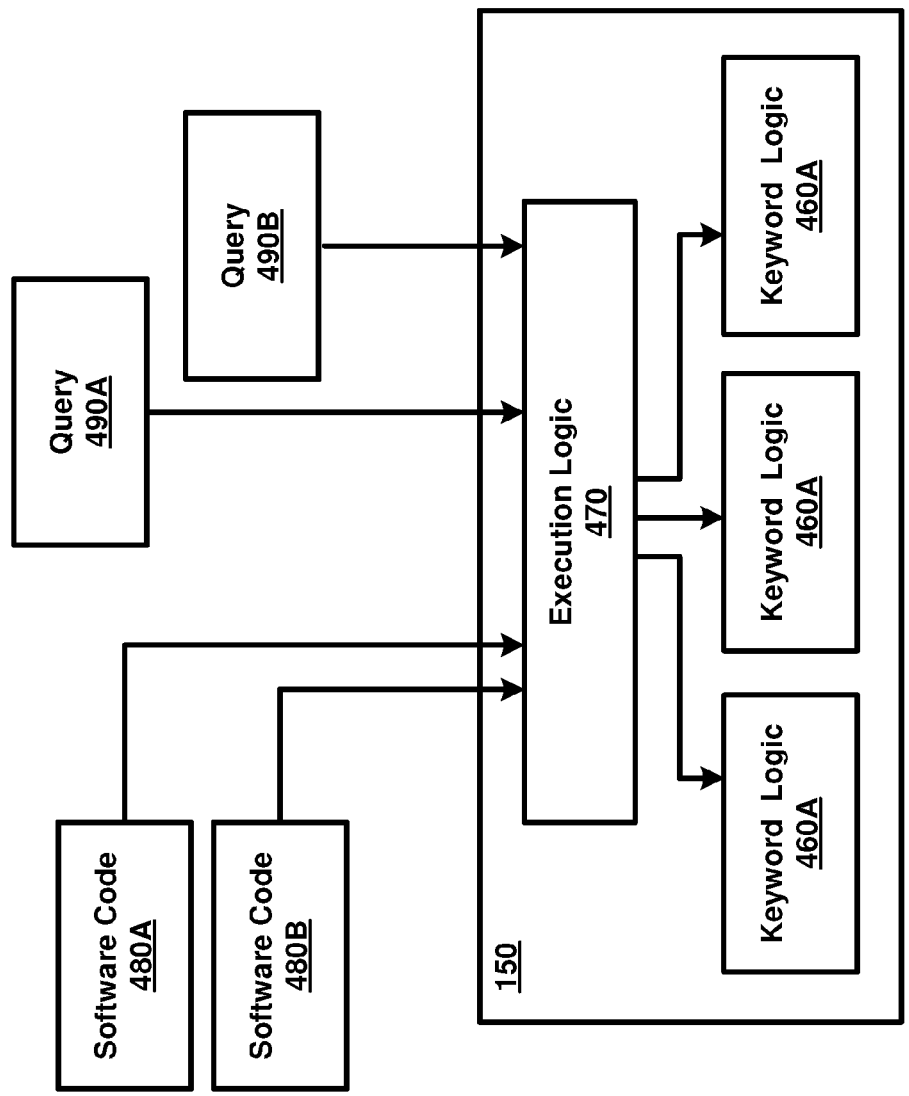
FIG. 4B is a block diagram illustrating logically the difference between program logics executed in response to keywords and software code defining the windows according to several aspects of the present invention.

FIG. 4B is a block diagram illustrating logically the difference between program logics executed in response to keywords and software code defining the windows according to several aspects of the present invention.

Each of keyword logic 460A-460C are contained within data stream manager 150, and represents the software instructions that are executed in response to keywords specified in queries. On receiving query 490B from a user, execution logic 470 determines the specific keywords indicated in the query and then executes the keyword logic corresponding to the specific keyword.

Thus, in a scenario that query 490B represents the string "select * from S [range 5 minutes];", execution logic 470 determines the keywords such as "select", "from", "range" etc. and executes the corresponding keyword logic. It may be observed that the keyword "range" defines a window and as such the corresponding keyword logic on execution determines the subset of values corresponding to the window at each time instant.

Each of software code 480A-480B represents software instructions that are provided by a developer from external to data stream manager 150 according to several aspects of the present invention. On receiving a query indicating a corresponding software code, execution logic 470 determines the specific software code indicated by the query and then processes the query based on execution of the specific software code.

Thus, query 490A may indicate one of such software codes 480A as determining the corresponding window. The subset of values for a window is then determined by executing the determined one of the software codes 480A/480B.

Accordingly, data stream manager 150 receives a query using a flexible window on a continuous data stream and a software code associated with the flexible window, and generates the result of the query based on the data values included in the (current) window based on execution of the software code. The manner in which a user may define and use a flexible window in querying a continuous data stream is illustrated with examples below.

6. Defining and Using a Flexible Window

In an embodiment of the present invention, a query language (such as CQL) is extended to enable a user to associate a software code with a flexible window as shown below:

create window present_month implement using "UserExtensions.CurrentMonth";

wherein the words "create", "window", "implement", "using" and ";" represent constructs having pre-defined meaning in the query language.

The above command enables a user to define a flexible window identified by a window identifier "present_month", which is associated with the software code present in the class "CurrentMonth" in a package called "UserExtensions" (assuming that the package contains the object code corresponding to the class "CurrentMonth").

Thus, data stream manager 150 may receive the package called "UserExtensions" containing the portions of software code corresponding to "CurrentMonth" from one of client systems 110A-110C. Data stream manager 150 may further receive the above command from the same/different client system. On receiving the above statement/command, data stream manager 150 associates the software code ("CurrentMonth") with the window identifier "present month".

A user after associating a software code with a window may then send a query using the identifier as shown below:

select * from R[present_month];

wherein R represents a continuous data stream and "present_month" is the window identifier associated with a software code.

The above query specifies that all the values (as indicated by the "*") in a window identified by "present_month" (as indicated by "[present_month]") on continuous data stream "R" be returned as the output of the query at every time instant. It may be observed that the new window "present_month" behaves like a construct of the query language.

While the above query is shown with absence of a selection criteria (usually by a where construct), it should be appreciated that other queries with such selection criteria may be received. As may be appreciated, the selection criteria causes a subset of the data values in the window to provided as the output at the corresponding time instant.

From the above, it may be appreciated that the identifier present_month identifies the software code to be executed when the data values to be contained in a window at each time instance are to be determined. However, various alternative approaches can be employed to identify the software code. For example, such association can be performed even without using the command shown above. As an illustration, data stream manager 150 on receiving a software code may automatically associate a default identifier (e.g., the name of the class "CurrentMonth") to the received software code. As another example, the query language may be extended to enable a user to specify the identifier of the software code "UserExtensions.CurrentMonth" directly in the query.

Thus, in the illustrative example of above, a user may define a flexible window by associating a window identifier with a software code and then use the flexible window by specifying the window identifier (or alternatively the identifier of the software code) in queries. The user may be required to provide the software code in a pre-determined format. The manner in which a user provides a software code for associating with flexible windows is described below with examples.

7. Providing Software Code for Flexible Windows

FIGS. 5A and 5B illustrate the manner in which a user provides software code for associating with flexible windows used in querying a continuous data stream in an embodiment. Each of the Figures is described in detail below.

Broadly, a user writes a software code based on a pre-defined format/interface containing pre-defined functions. The software code is then associated with a window. On receiving a query indicating the window, data stream manager 150 determines the values to be included in the window at each time instant of interest by invoking/executing the pre-defined functions.

FIG. 5A depicts a portion of an interface based on which a software code associated with a window used in querying a continuous data stream is written in an embodiment. Though the instructions of the interface are shown specified in Java™ programming language, it should be appreciated that the features can be implemented in other environments and programming languages.

Lines 511-514 define an interface called "GenericTimeWindow" containing two functions "expireW" and "visibleW" that need to be implemented in the software code associated with a window.

In line 512, the format of the function "expireW" is defined. The function "expireW" accepts a time instant "r" (coded as a "Timestamp" class in Java™) as the first parameter and returns the first time instant "result" (as the second parameter) indicating the time when an event occurring at time instant "r" will expire.

Thus, time instant "result" indicates the time when the value associated with the event will be excluded from the window as the query is continuously evaluated over time. Further, the function "expireW" returns a boolean value with a "true" value indicating that an event arriving at time instant "r" will expire and a "false" value indicating that an event arriving at time instant r will never expire.

In line 513, the format of the function "visibleW" is defined. The function called "visibleW" accepts a time instant "r" as the first parameter and returns the first time instant "result" (as the second parameter) indicating the time when an event occurring at time instant "r" will be visible. Thus, time instant "result" indicates the time when the value associated with the event will be included in the window as the query is evaluated over time. Further, the function "visibleW" returns a boolean value with a "true" value indicating that an event arriving at the time instant "r" will be visible and a "false" value indicating that an event arriving at time instant "r" will never be visible.

In general the two functions "expireW" and "visibleW" are defined in such a way that they are both non-decreasing functions over time, that is, the result of the function for a time instant is always greater than (or equal to) the result corresponding to a previous time instant. Further, it is ensured that a result of the "visibleW" function for a specific time instant is not less than the specific time instant itself (i.e., events are included in a window only after their occurrence) and that the result is not greater than the result of the "expireW" function for the same specific time instant (i.e., events are included in a window before expiring).

It may be appreciated that the above functions enable the determination of the current window at different time instants and the generation of the corresponding output of the query. As such, a user may be required to implement/write the above two functions in the software code associated with the window as described in detail below.

FIG. 5B depicts a portion of a software code associated with a window used in querying a continuous data stream in an embodiment. Though the instructions of the software code are shown specified in Java™ programming language, it should be appreciated that the features can be implemented in other environments and programming languages.

Lines 531-548 depict a class that implements a window having a width of the current month (based on the time instant at which the window is determined). In line 531, the name "CurrentMonth" of the class is specified. Line 531 also indicated that the class "CurrentMonth" implements the interface "GenericTimeWindow" (defined in line 511) containing the functions required for associating the software code with a window.

In line 532, a variable "cal" is defined as a "Calendar" class. The "Calendar" class enables calculations of date and time to be performed with relative ease by providing internal fields for the month, year, hour, etc. Lines 533-535 depict a constructor function, which is invoked when an instance of the class "CurrentMonth" is created. In line 534, the variable "cal" is initialized with an instance of the "Calendar" class.

Lines 536-543 depict an implementation of the "expireW" function defined in line 512. In lines 537 and 538, the month and the year of the first parameter "r" (depicting the time instant at which an event has occurred) are retrieved. In line 539, the date and time values stored in the "cal" variable are cleared.

In line 540, the date value of the "cal" variable is set to the year of the first parameter, one month more than the month of the first parameter (depicted as "month+1"), and the date is set to "1". In line 541, the values in the "cal" variable are copied to the second parameter "result" which indicates the time when the event happening at time instant "r" will expire (that is, will be excluded from the window). In line 542, the value of "true" is returned indicating that the event occurring at time instant "r" will expire.

Lines 544-547 depict an implementation of the "visibleW" function defined in line 513. In line 545, the values in the first parameter "r" (depicting the time instant at which an event has occurred) are copied to the second parameter "result" which indicates the time when the event happening at time instant "r" will be visible (that is, will be included in the window). In line 546, the value of "true" is returned indicating that the event occurring at time instant "r" will be visible.

It may be observed that the function "visibleW" indicates that an event occurring at time instant "r" will be visible immediately (since the values of "result" are set to the values in "r" in line 545). Further, the function "expireW" indicates that the event at time instant "r" will expire at the beginning of the next month (since the values of "result" are set to one month more than the values of "r" and the date is set to "1" in lines 537-541). As such, the above two functions defines a window of width the current/present month.

Thus, the portions of code depicted in FIGS. 5A and 5B may be provided together as a package (or converted to object/intermediate code and then provided in the package). In one embodiment, the portions of code depicted in FIGS. 5A and 5B are converted to object code (typically machine understandable, but not human readable form) and then provided in a package named "UserExtensions.CurrentMonth" to data stream manager 150.

A user may then send a command for associating the software code with a window identifier and then send queries indicating the window identifier for processing continuous data streams based on the set of values (forming the window) determined by execution of the software code as described in detail above.

It may be further appreciated that the software code is provided external to (not part of the data forming) the query. Thus, in a networked environment, the query may be received in one packet, while the software code may be retrieved by other mechanisms (including other packets). By such decoupling, the same software code may be referred and used by various other queries as well.

Though the software code (of FIGS. 5A and 5B) of above is shown with respect to time-based windowing techniques for illustration, it may be appreciated that the technique can be applied to other windowing techniques (such as partition based windowing and tuple-based windowing) as well by appropriate modification of the interface depicted in FIG. 5A. The software thus developed can be used in various ways in sending requests from client systems.

It may be appreciated that different queries containing the identifier "present_month" (which identifies the software code, as described above) may be received, and corresponding windows may be determined by executing different instances of the same software code. Also, the different queries may specify that the same software code (by using the identifier "present_month") be used to determine windows on different continuous data streams. The manner in which such a query is processed by data stream manager 150 is described with examples below.

8. Processing Queries Using Flexible Windows

Figure 6:
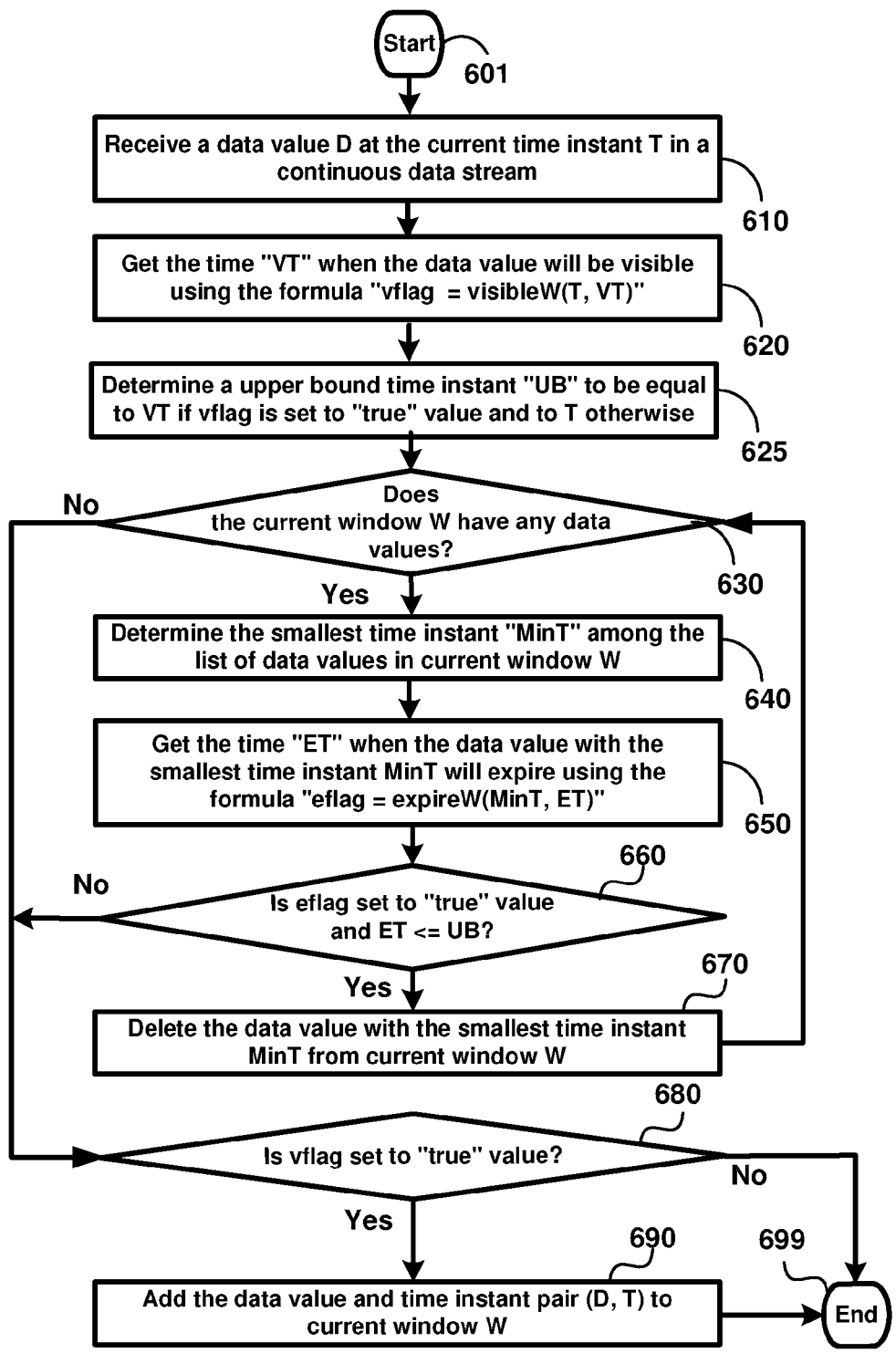
FIG. 6 is a flowchart illustrating the manner in which each data value received in a continuous data stream is determined to be included/excluded in a current window used to process a query on the continuous data stream according to an aspect of the present invention.
Figure 7:
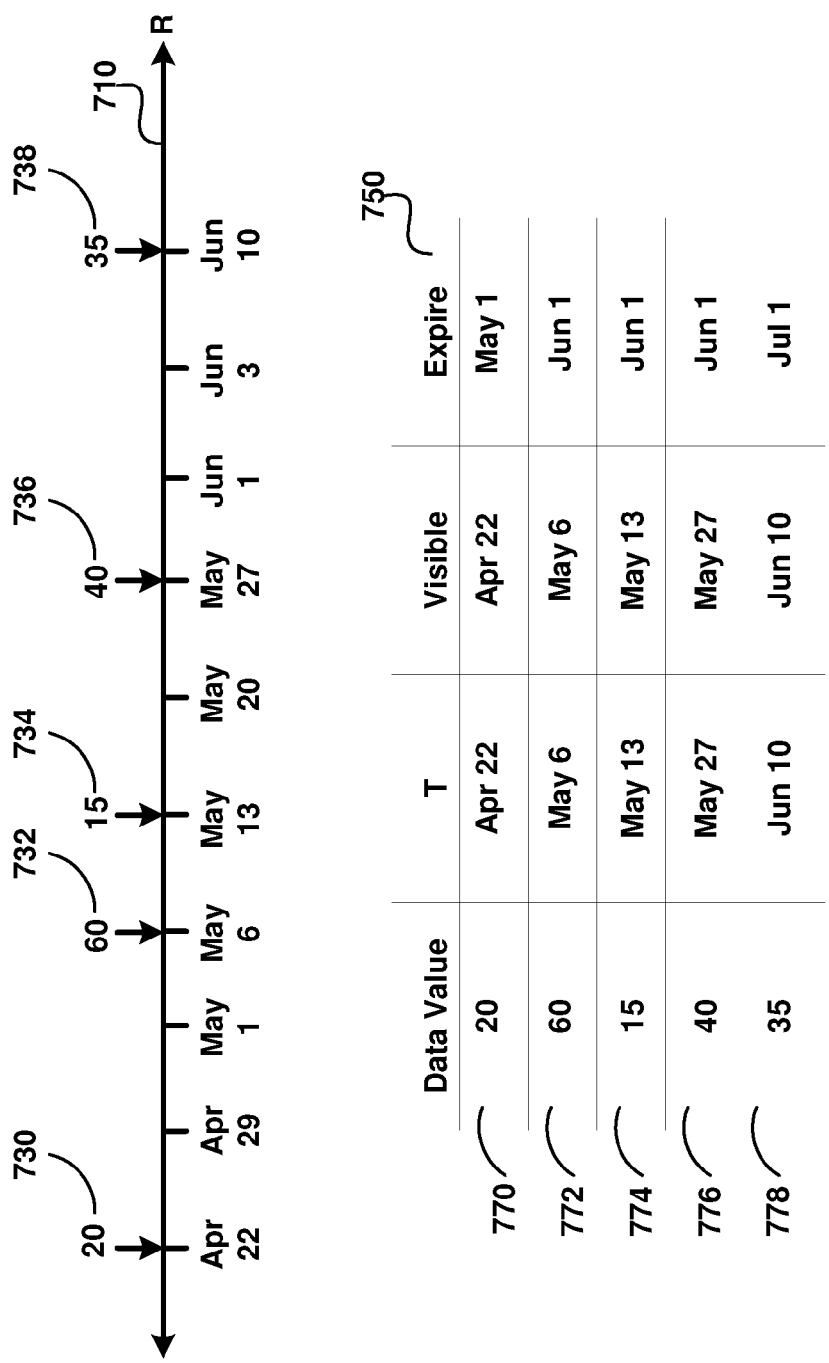
FIG. 7 depicts a timeline containing sample data values received in a continuous data stream and a corresponding table that may be generated in memory based on execution of a software code associated with a window in an embodiment.

FIGS. 6 and 7 illustrate the manner in which queries using flexible windows are processed in an embodiment. Each of the Figures is described in detail below.

Data stream manager 150, on receiving a query, first determines the data values to be included in the current window based on the execution of the software code associated with the window. As such the description is continued describing the manner in which data stream manager 150 (in particular query processor 420) determines the current window for a present time instant when processing a query on a continuous data stream.

FIG. 6 is a flowchart illustrating the manner in which each data value received in a continuous data stream is determined to be included/excluded in a current window used to process a query on the continuous data stream according to an aspect of the present invention.

The flowchart is described with respect to FIGS. 1 and 4 for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations contemplated to be covered by several aspects of the present invention.

The description is continued assuming W represents the current window at the current time instant and contains multiple pairs, with each pair indicating a data value received at a corresponding time instant. The flow chart begins in step 601, in which control immediately passes to step 610.

In step 610, query processor 420 receives a data value D at the current time instant T in a continuous data stream. The current time instant T may represent the time when data value D was generated or received from one of sources 160A-160B. Alternatively, an application executing in a system associated with the data source may generate and associate appropriate time instants to the corresponding data values.

In step 620, query processor 420 gets the time VT when the data value will be visible using the formula "vflag=visibleW (T, VT)". As described in detail above in relation to FIG. 5B, the function "visibleW" is implemented in the software code (associated with the flexible window) and returns the time VT when the data value will be visible, that is, included in the current window.

In step 625, query processor 420 determines an upper bound time instant UB to be equal to VT if vflag is set to "true" value and to T otherwise. The upper bound time instant UB represents the maximum time instant up to which, query processor 420 may infer the contents of window W (based on previous content). Thus, query processor 420 determines the content of window W between the last output time instant (LOT) to the upper bound time instant UB including changes occurring to the content of window W due to expiry of previously included events.

It may be observed that in the scenario that vflag is false (and T becomes upper bound), the current data value at time T, by definition, will never be visible and will not be included in the current window W.

In step 630, query processor 420 checks whether the current window W has any data values. Control passes to step 640 in the scenario that at least one data value is included in current window W and to step 680 otherwise.

In step 640, query processor 420 determines the smallest time instant MinT among the list of data values in current window W. The determination may be performed using a suitable program logic/algorithm using the time instants that are paired with the data values in the current window W. For example, data values in current window W may be maintained in the form of a linked list sorted by the corresponding time instants (in a non-decreasing order) with the time instant of the first element in the linked list corresponding to the smallest time instant MinT.

In step 650, query processor 420 gets the time ET when the data value with the smallest time instant MinT will expire using the formula "eflag=expireW(MinT, ET)". The functions "expireW" is also implemented in the software code associated with the flexible window (as depicted in FIG. 5B) and returns the time ET when the data value will expire, that is, excluded from the current window.

In step 660, query processor 420 checks whether eflag is set to "true" value and that ET<=UB? In other words, query processor 420 verifies that the data value with the minimum time instant will expire and that the expiry time (returned by the function "expireW") is less than or equal to the upper bound time. Thus, query processor 420 determines whether the data value is to be excluded (in the scenario that the above conditions are met) from the current window. Control passes to step 670 if the data value is to be excluded and to step 680 otherwise.

In step 670, query processor 420 deletes the data value with the smallest time instant MinT from the current window W, that is, the data value and the corresponding time instant pair is removed from the current window W, thus, causing a change in the content of current window W at time ET. Control then passes to step 630.

Thus, the steps of 630, 640, 650, 660 and 670 are repeated to identify and remove the data values that are to be excluded (based on the function "expireW" implemented in the software code) from the current window.

In step 680, query processor 420 checks whether vflag is set to "true" value, that is, whether, the current data value D is visible. Control passes to step 690 if the current data value is visible and to step 699 otherwise.

In step 690, query processor 420 adds the current data value and current time instant pair (D, T) to current window W. It may be appreciated that in a scenario that the value is visible immediately. The value will be visible by definition only at time VT which in general could be greater than time instant T corresponding to the received event. The flow chart ends in step 699.

It may be appreciated that the steps of FIG. 6 are only performed when a data value is received in the continuous data stream. Thus, the above steps determine only the time instants (for example LOT and UB as indicated in step 625) at which the contents of the current window W are modified. As such, query processor 420 may process and generate output of a query based on the contents of the window W for any of the time instants between LOT and UB where the contents of the window are modified.

Various approaches to indicating the set of data values in the current window at different time instants (based on the determination of query processor 420) may be employed as will be apparent to one skilled in the relevant arts. In one embodiment, query processor 420 maintains (and processes) the changes between consecutive windows determined at consecutive time instants using an incremental representation. The incremental representation indicates time instants at which a data value is to be included in and excluded from a window.

As such, in step 690, query processor 420 may add a notation such as "+(D, VT)" indicating that the data value "D" is to be included (as indicated by the "+") in the current window at time instant "VT" (the visible time of data value "D" as determined by the "visibleW" function).

Further in step 680, query processor 420 may add a notation such as "−(d, ET)" wherein "d" represents the data value with the smallest time instant MinT from the current window W. The notation indicates that the data value "d" is to be excluded (as indicated by "−") from the current window at time instant "ET" (the expiry time of data value "D" as determined by the "expireW" function).

Further, query processor 420 may also generate and store the outputs at corresponding time instants in the same incremental representation in queue 440. Output generator 450 may then inspect queue 440 and generate a corresponding outputs of the query as indicated by the incremental representation stored in queue 440.

The description is continued illustrating the manner in which a query using flexible windows is processed with examples.

9. Example Illustrating Processing Queries Using Flexible Windows

FIG. 7 depicts a timeline containing sample data values received in a continuous data stream and a corresponding table that may be generated in memory based on execution of a software code associated with a window in an embodiment.

Timeline 710 depicts time instants of interest when receiving events on a continuous data stream "R". It is assumed that the data values on the continuous data stream "R" are received every day and as such the time instants represent the dates of interest.

Timeline 710 depicts the time instants "Apr. 22", "Apr. 29", "May 1", "May 6", "May 13", "May 20", "May 27", "Jun. 1", "Jun. 3" and "Jun. 10" (with "Apr.", "May", "Jun." etc. representing the respective months of April, May, June etc.). Events 730, 732, 734, 736, and 738 represent the respective values "20", "60", "15", "40", and "35" received at the respective time instants "Apr. 22", "May 6", "May 13", "May 27", and "Jun. 10".

Table 750 depicts a table that may be generated in memory corresponding to the events in timeline 710 based on the execution of the software code associated with a current window (for example, the software code depicted in FIG. 5B). Table 750 has the columns "Data Value" indicating the data value received for each of the events, column "T" indicating the time instant at which the corresponding data values were received, column "Visible" indicating the time instant when a corresponding data value will be visible (i.e., included in the current window), and column "Expire" indicating the time instant when a corresponding data value will expire (i.e., excluded from the current window).

Rows 770, 772, 774, 776 and 778 represent entries in the table corresponding to the respective events 730, 732, 734, 736, and 738. In particular, row 770 (corresponding to event 730) specifies that a data value "20" (shown in column "Data Value") received at the time instant "Apr. 22" (shown in column "T") will be included in the current window from the time instant "Apr. 22" (shown in column "Visible") and will be exclude from the current window from the time instant "May 1" (shown in column "Expire").

It may be observed that the values in column "Visible" and "Expire" correspond to the values returned (as the second parameter) from the respective functions "visibleW" and "expireW" implemented in the software code depicted in FIG. 5B, when the functions are invoked with the time instant T as the first parameter. It may be further observed that each of the data values expires at the beginning of the next month (one month more than the month when the data value is received).

The description is continued assuming that data stream manager 150 receives a software code (depicted in FIG. 5B) associated with a window identified using the identifier "present_month" (as described above) and a query on a continuous data stream "R" using the flexible window such as:

select * from R[present_month];

As described above, such a query specifies that all the values in a window identified by "present_month" on continuous data stream "R" be returned as the result of the query at every time instant. It is further assumed that the query is received at the time instant "Apr. 22", and the current window W is empty (represented as { }).

At time instant T="Apr. 22", data stream manager 150 receives the data value D="20" in step 610. In step 620, the visible time VT is calculated to be "Apr. 22" (as depicted in row 770) and vflag is set to "true" value (since the "visibleW" functions depicted in FIG. 5B always return "true" value). In step 625, the upper bound time UB is set to "Apr. 22" (same as VT since vflag is set to "true" value). In step 630, control passes to step 680, since the current window W does not have any data values. In step 680, control is passed to step 690 since the value of vflag is "true". In step 690, the data value and time instant pair (20, "Apr. 22") is added to the current window W, making the current window W to be {(20, "Apr. 22")}.

Since the query specifies that all the data values in the current window W be returned, the output of the query at time instant T="Apr. 22" will be "20". At time instant T="Apr. 29", the current window W remains the same as the window at time instant "Apr. 22". As such, the output of the query at time instant T="Apr. 29" (in general, the time instants between "Apr. 23" to "Apr. 31") will also be "20".

At time instant T="May 6", the data value D="60" is received in step 610. In step 620, the visible time VT is calculated as "May 6" (as depicted in row 772) and vflag is set to "true". In step 625, the upper bound time UB is set to "May 6" (same as VT since vflag is set to "true" value).

It may be appreciated that the output of the query at time instant T="May 1" may be generated at this step corresponding to the expiry of the event 730. As such, an empty value " " is generated corresponding to the removal of the data value "20" from the current window at time instant T="May 1" (in general for all the time instants between "May 1" and "May 5").

In step 630, control passes to step 640 since the current window W={(20, "Apr. 22")} contains a data value. In step 640, the smallest time instant MinT is determined to be "Apr. 22" since there is only one data value. In step 650, the expiry time ET of the smallest element is determined to be "May 1" (as depicted in row 770) and eflag is determined to be "true" value (since the "expireW" function depicted in FIG. 5B always return "true" value).

In step 660, control is passed to step 670 since eflag value is "true" and ET<UB ("May 1"<"May 6"). In step 670, the pair "(20, Apr. 22)" having the smallest time instant is removed from the current window W making it empty { }. Control passes to step 630 and then to step 690 (via step 680) since the current window W is empty and vflag is true. In step 690, the current data value is added to W, making W={(60, "May 6")}. Data stream manager 150 generates the output of the query at time instant "May 6" to be "60" based on the data values in the current window W.

At time instant T="May 13", the data value D=15 is received in step 610. In step 620 the visible time VT is calculated as "May 13" and vflag is set to "true". In step 625, the upper bound time UB is set to "May 13" (same as VT since vflag is set to "true" value). Control is passed to step 660 (via steps 630, 640, 650 and 660), during which the smallest time instant MinT is determined to be "May 6", the expiry time ET is determined to be "Jun. 1", and the eflag is set to "true" value. In step 660, control is passed to step 690 (via step 680) since the condition ET<=UB is not satisfied (since "Jun. 1">"May 13") and vflag is set to "true" value. In step 690, the current data value is also added to W, making W={(60, "May 6"), (15, "May 13")}. Thus, at time instant "May 13", data stream manager 150 generates the output of the query to be "60, 15".

At time instant T="May 20", the current window W remains the same as the previous time instant. At time instant T="May 27", the data value D=40 is received and added to the current window W (the flow being similar to the time instant "May 13"), making W={(60, "May 6"), (15, "May 13"), (40, "May 27")}. The output of the query is generated by data stream manager 150 to be "60, 15, 40" based on the current window W.

At time instant T="Jun. 3", each of the data values in W is removed (similar to time instant "May 6") during multiple iterations of the steps 630, 640, 650, 660 and 670 since the expiry time ET="Jun. 1" corresponding to each of the data values is less than the upper bound UB="Jun. 3". Since no data value is received at the current instant, no data values are added to the current window W.

As such, the current window W becomes empty { } and the result of the query is generated by data stream manager 150 to be an empty value " ". It may be appreciated that the empty value is generated at time instant T="Jun. 1" similar to the determination at time instant T="May 1".

Thus, data stream manager 150 on receiving a query on a continuous data stream using a flexible window and a software code associated with the window first determines the data values (received in the continuous data stream) that are to be included in the current window based on the execution of the software code associated with the window. Data stream manager 150 then generates an output of the query by performing the operations (such as returning the data values) specified by the query on the data values included in the current window.

It may be appreciated that a user/developer desiring to specify multiple windows needs to provide software codes corresponding to the multiple windows. For example, if a developer desires three windows that define a width of one month, two months, and three months respectively, the developer may be required to provide three software codes (containing corresponding logic) for each of the three windows. In the scenario, that the multiple windows are related to each other it may be desirable to reduce the burden of the developer.

An aspect of the present invention enables a developer to provide a software code designed to accept a set of values as parameters. The developer then may specify a family of logics by specifying different sets of values for the parameters. Thus, in the above example, a window (and the corresponding software code) may accept a "range" parameter indicating the width of the window as number of months. As such windows of width one, two and three months may be associated with the same software code (with "range" parameter taking corresponding values 1, 2 and 3), wherein the software code defines a window of width according to the "range" parameter. The manner in which a family of logics defining windows may be provided using parameters is described with examples below.

10. Flexible Windows with Parameters

FIGS. 8A and 8B illustrate the manner in which a family of logics defining windows is provided using parameters in an embodiment of the present invention. Each of the Figures is described in detail below.

It may be appreciated that in order to support windows with parameters, the software code associated with the window may need to be modified to accept the parameters. The description is continued describing a software code associated with a window, which accepts parameters.

FIG. 8A depicts a portion of a software code associated with a window accepting parameters used in querying a continuous data stream in an embodiment. Though the instructions of the software code are shown specified in Java™ programming language, it should be appreciated that the features can be implemented in other environments and programming languages.

Lines 811-830 depict a class that implements a window having a variable width. In line 811, the name "RangeMonth" of the class is specified. Line 811 also indicated that the class "RangeMonth" implements the interface "GenericTimeWindow" (defined in line 511) containing the functions required for associating the software code with a window.

In line 812, a variable "cal" is defined as a "Calendar" class. The "Calendar" class enables calculations of date and time to be performed with relative ease by providing internal fields for the month, year, hour, etc. In line 813, a variable "range" is defined which represents the variable width of the window.

Lines 814-817 depict a constructor function, which is invoked when an instance of the class "RangeMonth" is created. It may be observed that the constructor function accepts a parameter "range" (in line 814) of type "int" (integer) whose value is copied (in line 816) into the "range" variable defined in line 813. The "range" parameter represents a value that would be specified as a parameter of a window in a query. Though the constructor function is shown accepting only a single parameter, it may be appreciated that multiple parameters (of different types) may be provided enabling definition of windows accepting multiple parameters.

In line 815, the variable "cal" is initialized with an instance of the "Calendar" class. As such, the variable "cal" contains the date and time at which the initialization was performed. Lines 818-825 depict an implementation of the "expireW" function and lines 826-829 depict an implementation of the "visibleW" function. The lines 818-829 are similar to lines 536-547 and therefore not explained for conciseness.

It may be observed that in line 822, the month value of the "cal" variable is set to the month of the first parameter added to the value of the "range" variable (depicted as "month+range"), and the date is set to "1". As such, the function "expireW" indicates that the event at time instant "r" will expire at the beginning of "range" months after the month of the event. Further, the function "visibleW" indicates that an event occurring at time instant "r" will be visible immediately. Thus, the above two functions defines a window of width indicated by the value of "range".

The software code thus developed can be used in various ways in sending requests from client systems. The description is continued describing the manner in which the software code associated with a flexible window accepting parameters is used in querying a continuous data stream in an embodiment.

11. Defining and Using Flexible Windows with Parameters

As described above, the portion of code depicted in FIG. 8A (together with the portion of code depicted in FIG. 5A) may be provided as a package in a source format or in an object/intermediate format. The software code contained in the package is then associated with a flexible window with parameters.

In an embodiment of the present invention, the query language is further extended to enable a user to associate a software code with a flexible window accepting parameters as shown below:

create window range_month(int range) implement using "Extensions.RangeMonth";

wherein the words "create", "window", "int", "implement", "using" and ";" represent constructs having pre-defined meaning in the query language. The above query enables a user to define a flexible window identified using an identifier "range_month" accepting a parameter "range" having type "int" (integer). The flexible window is associated with the software code present in the class "RangeMonth" (the portion of code depicted in FIG. 8A) in a package called "Extensions" (assuming that the package contains the code corresponding to the class "RangeMonth").

Thus, data stream manager 150 may receive the package called "Extensions" containing the portions of software code depicted in FIG. 8A from one of client systems 110A-110C. Data stream manager 150 may further receive the above query from the same/different client system. On receiving the above statement, data stream manager 150 associates the software code ("RangeMonth") with the window ("range_month") accepting a single parameter ("range").

It may be observed the parameter "range" of the window corresponds to the parameter "range" of the constructor function (depicted in lines 814-817) of the software code associated with the window. When a query is received specifying a value for the parameter, the value is passed to the software code when the constructor function is invoked (during the creation of an instance of the software code).

A user after associating a software code with a window accepting parameters may then send a query using the window as shown below:

select * from R[range_month(1)];

wherein R represents a continuous data stream. The above query specifies that all the values (as indicated by the "*") in a window identified by "range_month" accepting the parameter "1" (as indicated by "[range_month(1)]") on continuous data stream "R" be returned as the output of the query at every time instant.

Thus, when the above query is received, an instance of the software code "RangeMonth" is created and the constructor function is invoked with the "range" parameter set to value "1" corresponding to the value specified in the query. The software code then defines a window of 1 month (since the width of the window is defined by the "range" parameter).

In the scenario that a user desires to define a window of two months, the user may send a query such as shown below:

select * from R[range_month(2)];

The above query specifies that all the values in a window identified by "range_month" accepting the parameter "2" on continuous data stream "R" be returned as the result of the query. By specifying the parameter value "2", the software code associated with the window "range_month" defines a window of width two months.

Thus, the same window "range_month" associated with the same software code "Extensions.RangeMonth" may be used to represent a family of related windows having widths of 1 month, 2 months, 3 months etc. It may be observed that the window "range_month" with parameter value "1" corresponds to the previous window "present_month" associated with the software code "UserExtensions.CurrentMonth".

As such, it may be appreciated that the above queries may be processed similar to the processing of queries on windows without parameters (described in relation to FIGS. 6 and 7). For example, in the scenario that the window "range_month" is invoked with parameter value "1", the current window at various time instants may be determined using table 750 generated corresponding to the data values received in timeline 710. In the scenario that the parameter value is "2", a different table may be generated using the same software code as explained in detail below.

FIG. 8B depicts a table that may be generated in memory corresponding to data values received in a continuous data stream when software code associated with a window accepting parameters is executed in an embodiment. The table is described assuming that data values are received similar to timeline 710 described in FIG. 7. Further, it is assumed that the software code depicted in FIG. 8A (associated with the current window) is invoked with the "range" parameter taking the value "2".

Table 850 depicts a table that may be generated in memory corresponding to the events in timeline 710 based on the execution of the software code associated with a current window (for example, the software code depicted in FIG. 8A). Table 850 has columns similar to table 750 and therefore not explained for conciseness.

Rows 870, 872, 874, 876 and 878 represent entries in the table corresponding to the respective events 730, 732, 734, 736, and 738 (and therefore are similar to rows 770, 772, 774, 776 and 778). It may be observed that the values in column "Expire" are different to the corresponding values in table 750, since the "expireW" function in line 822 adds the beginning of "range" months after the month of the event. Thus, in row 870, the event received at time instant "Apr. 22" will expire at the beginning of "2" (the parameter value) months in "Jun. 1".

Data stream manager 150 may then generate the output of the query (where the parameter value is specified as "2") based on the determination of the data values in the current window (at the time when the output of the query is to be generated). The current window may be determined using the steps described in FIG. 6. As such, at time instant T="May 20", the current window W may be determined to be {(20, "Apr. 22"), (60, "May 6"), (15, "May 13")}. It may be observed that the data value "20" received at time instant "Apr. 22" is not removed from the current window W since expire date is "Jun. 1" (as depicted in row 870).

Thus, by specifying different values for the parameters accepted by a window (and the associated software code), a family of logics defining windows may be represented using a single window (and a single associated software code).

It should be appreciated that the various features of data stream manager 150 and each of client systems 110A-110C may be implemented in various embodiments as a desired combination of one or more of hardware, software and firmware. The description is continued with respect to an embodiment in which various features are operative when software instructions are executed.

12. Digital Processing System

Figure 9:
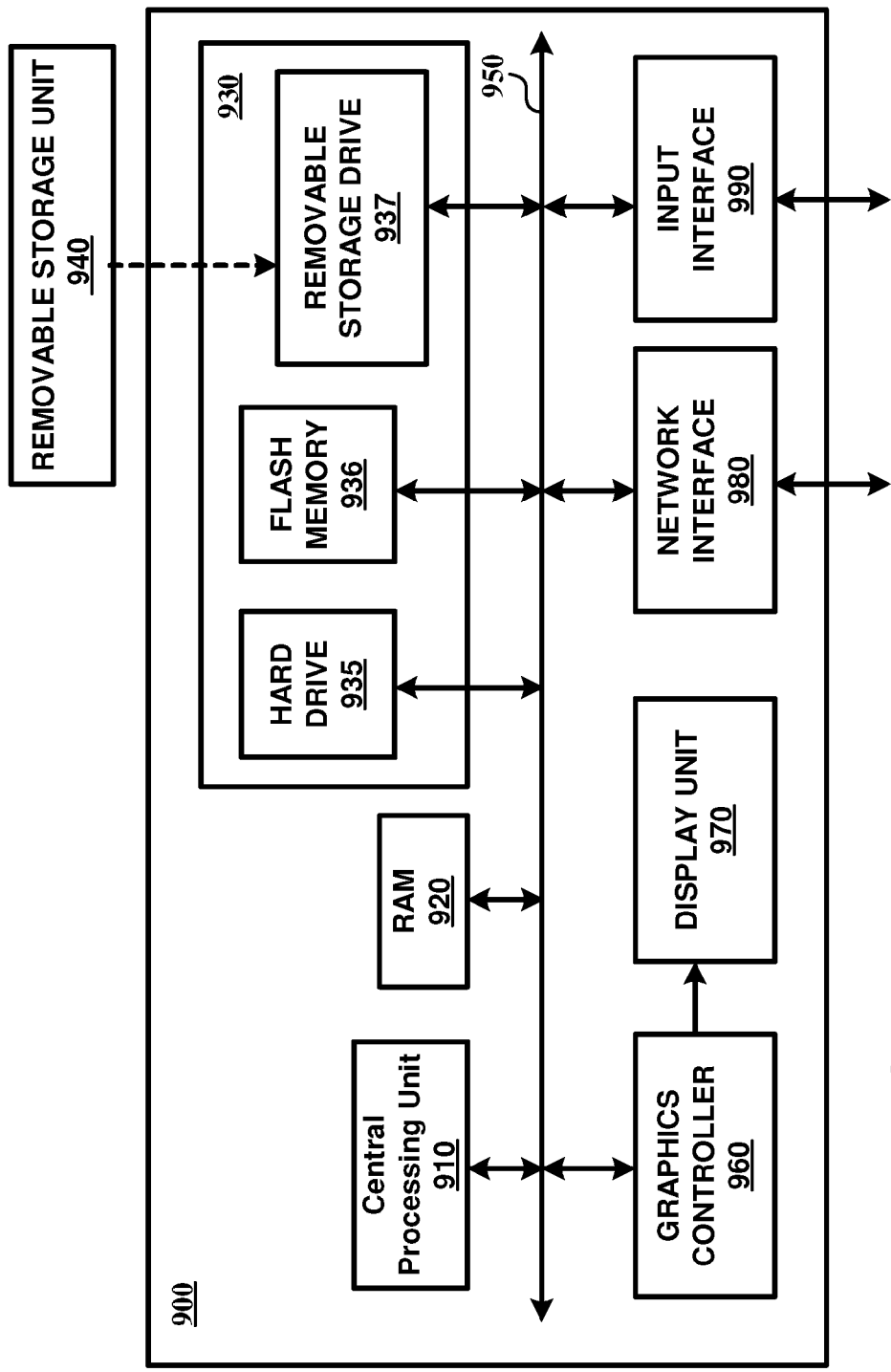
FIG. 9 is a block diagram illustrating the details of a digital processing system in which various aspects of the present invention are operative by execution of appropriate software instructions.

FIG. 9 is a block diagram illustrating the details of digital processing system 900 in which various aspects of the present invention are operative by execution of appropriate software instructions. Digital processing system 900 may correspond to any of data stream manager 150 and client systems 110A-110C.

Digital processing system 900 may contain one or more processors (such as a central processing unit (CPU) 910), random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present invention. CPU 910 may contain multiple processing units, with each processing unit potentially being designed for a specific task. Alternatively, CPU 910 may contain only a single general-purpose processing unit. RAM 920 may receive instructions from secondary memory 930 using communication path 950.

Graphics controller 960 generates display signals (e.g., in RGB format) to display unit 970 based on data/instructions received from CPU 910. Display unit 970 contains a display screen to display the images defined by the display signals. Input interface 990 may correspond to a keyboard and a pointing device (e.g., touch-pad, mouse). Network interface 980 provides connectivity to a network (e.g., using Internet Protocol), and to communicate with other connected systems (such as clients systems 110A-110C or data stream manager 150) of FIG. 1.

Secondary memory 930 may contain hard drive 935, flash memory 936, and removable storage drive 937. Secondary memory 930 may store the data (e.g., data depicted in FIG. 7) and software instructions (e.g., portions of software code depicted in FIGS. 5A, 5B), which enables digital processing system 900 to provide several features in accordance with the present invention.

Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 940 or hard disk installed in hard drive 935. These computer program products are means for providing software to system 900. CPU 910 may retrieve the software instructions, and execute the instructions to provide various features of the present invention described above.

13. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of supporting a family of logics defining windows of continuous data streams in a data stream management system, said method comprising:

receiving a common software code designed to execute using a set of values as parameters, wherein execution of said common software code with a corresponding set of values for said parameters results in a corresponding one of said family of logics;

receiving a query to be executed on a continuous data stream, wherein said query specifies a first set of parametric values corresponding to a desired logic contained in said family of logics;

identifying a plurality of data values, among many data values received by said data stream management system, as being received in said continuous data stream;

determining, from among said plurality of data values identified as being received in said continuous data stream, a set of data values to be included in a first window corresponding to a first time instant based on said desired logic caused by executing said software code using said first set of parametric values as said set of values, wherein said identifying identifies a first data value as being received in said continuous data stream, wherein said determining comprises:

checking whether said first data value is to be included in said window by executing said software code using said first set of parametric values as said set of values; and adding said first data value to said set of data values, only if said first data value is to be included in said first window; and generating an output of said query for said first time instant by processing said query based on said set of data values included in said first window.

2. The method of claim 1, further comprising:

receiving a second query to be executed on said continuous data stream, wherein said second query specifies a second set of parametric values corresponding to another desired logic contained in said family of logics;

wherein said determining determines, from among said plurality of data values identified as being received in said continuous data stream, a second set of data values to be included in a second window corresponding to a second time instant based on said desired logic caused by executing said software code using said second set of parametric values as said set of values, wherein said generating generates a second output of said second query for said second time instant by processing said second query based on said second set of data values forming said second window at said second time instant.

3. The method of claim 1, wherein said common software code contains at least one programming instruction according to a programming language.

4. The method of claim 3, wherein said common software code including said programming instruction, when executed using said first set of parametric values as said set of values, specifies a corresponding width in terms of a time interval for said first window at each of a corresponding time instants, wherein the width is variable and not equal for at least two of said time instants.

5. A machine readable medium storing one or more sequences of instructions for causing a data stream management system to support a family of logics defining windows of continuous data streams, wherein execution of said one or more sequences of instructions by one or more processors contained in said data stream management system causes said data stream management system to perform the actions of:

receiving a common software code designed to execute using a set of values as parameters, wherein execution of said common software code with a corresponding set of values for said parameters results in a corresponding one of said family of logics;

receiving a query to be executed on a continuous data stream, wherein said query specifies a first set of parametric values corresponding to a desired logic contained in said family of logics;

identifying a plurality of data values, among many data values received by said data stream management system, as being received in said continuous data stream;

determining, from among said plurality of data values identified as being received in said continuous data stream, a set of data values to be included in a first window corresponding to a first time instant based on said desired logic caused by executing said software code using said first set of parametric values as said set of values, wherein said identifying identifies a first data value as being received in said continuous data stream, wherein said determining comprises:

checking whether said first data value is to be included in said window by executing said software code using said first set of parametric values as said set of values; and adding said first data value to said set of data values, only if said first data value is to be included in said first window; and generating an output of said query for said first time instant by processing said query based on said set of data values included in said first window.

6. The machine readable medium of claim 5, further comprising one or more instructions for:

receiving a second query to be executed on said continuous data stream, wherein said second query specifies a second set of parametric values corresponding to another desired logic contained in said family of logics;

wherein said determining determines, from among said plurality of data values identified as being received in said continuous data stream, a second set of data values to be included in a second window corresponding to a second time instant based on said desired logic caused by executing said software code using said second set of parametric values as said set of values, wherein said generating generates a second output of said second query for said second time instant by processing said second query based on said second set of data values forming said second window at said second time instant.

7. The machine readable medium of claim 5, wherein said common software code contains at least one programming instruction according to a programming language.

8. The machine readable medium of claim 7, wherein said common software code including said programming instruction, when executed using said first set of parametric values as said set of values, specifies a corresponding width in terms of a time interval for said first window at each of a corresponding time instants, wherein the width is variable and not equal for at least two of said time instants.

9. A computing system comprising:

a plurality of data sources to send data values;

a client system to send a common software code and a query, wherein said common software code is designed to execute using a set of values as parameters, wherein execution of said common software code with a corresponding set of values for said parameters results in a corresponding one of a family of logics, wherein said query is to be executed on a continuous data stream, wherein said query specifies a first set of parametric values corresponding to a desired logic contained in said family of logics;

a data stream management system configured to:
  receive said common software code and said query from said client system;
  identify a plurality of data values, among many data values received from said plurality of data sources, as being received in said continuous data stream specified in said query;
  determine, from among said plurality of data values identified as being received in said continuous data stream, a set of data values to be included in a first window corresponding to a first time instant based on said desired logic caused by executing said software code using said first set of parametric values as said set of values; and
  generate an output of said query for said first time instant by processing said query based on said set of data values included in said first window, wherein said data stream management system identifies a first data value as being received in said continuous data stream, wherein to said determine, said data stream management system is further configured to:
  check whether said first data value is to be included in said window by executing said software code using said first set of parametric values as said set of values; and
  add said first data value to said set of data values, only if said first data value is to be included in said first window, wherein each of at least some of said plurality of data source, said client system and said data stream management system are implemented using a corresponding processor which retrieves instructions from a corresponding memory and executes the retrieved instructions.

10. The computing system of claim 9, wherein said data stream management system is further configured to:
  receive a second query to be executed on said continuous data stream, wherein said second query specifies a second set of parametric values corresponding to another desired logic contained in said family of logics,
  wherein said data stream management system determines, from among said plurality of data values identified as being received in said continuous data stream, a second set of data values to be included in a second window corresponding to a second time instant based on said desired logic caused by executing said software code using said second set of parametric values as said set of values,
  wherein said data stream management system generates a second output of said second query for said second time instant by processing said second query based on said second set of data values forming said second window at said second time instant.

11. The computing system of claim 9, wherein said common software code contains at least one programming instruction according to a programming language.

12. The computing system of claim 11, wherein said common software code including said programming instruction, when executed using said first set of parametric values as said set of values, specifies a corresponding width in terms of a time interval for said first window at each of a corresponding time instants, wherein the width is variable and not equal for at least two of said time instants.

* * * * *

UNITED STATES PATENT AND TRADEMARK OFFICE
CERTIFICATE OF CORRECTION

PATENT NO. : 8,103,655 B2  Page 1 of 1
APPLICATION NO. : 11/927683
DATED : January 24, 2012
INVENTOR(S) : Srinivasan et al.

It is certified that error appears in the above-identified patent and that said Letters Patent is hereby corrected as shown below:

IN THE SPECIFICATIONS:
In column 8, line 64, delete ""present month"." and insert -- "present_month". --, therefor.

Signed and Sealed this
Third Day of April, 2012

David J. Kappos
*Director of the United States Patent and Trademark Office*